March 17, 1942.    C. CODEBECQ    2,276,717
EFFICIENCY INDICATING MEANS FOR MOTOR VEHICLES
Filed Feb. 2, 1939
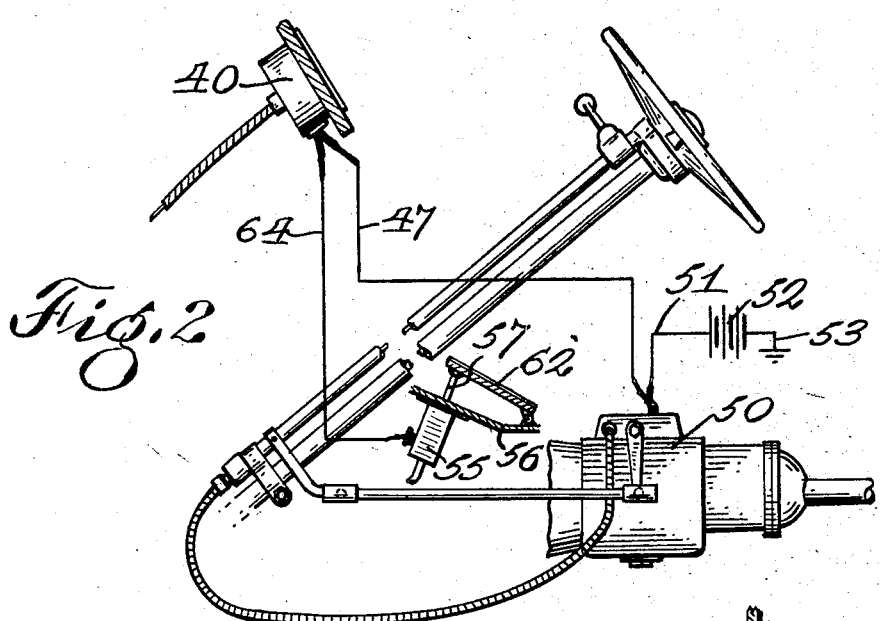
Fig. 2
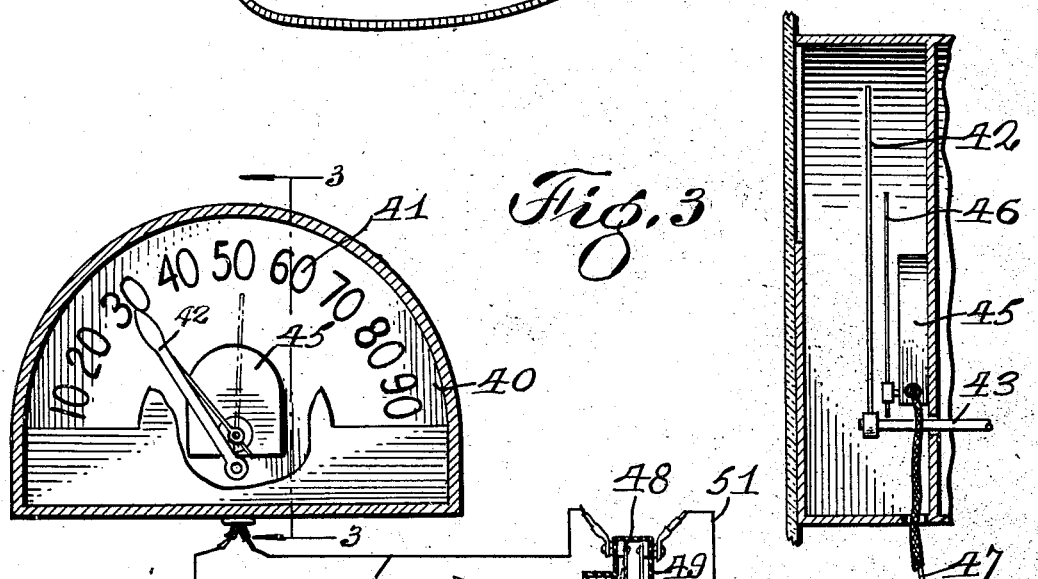
Fig. 3
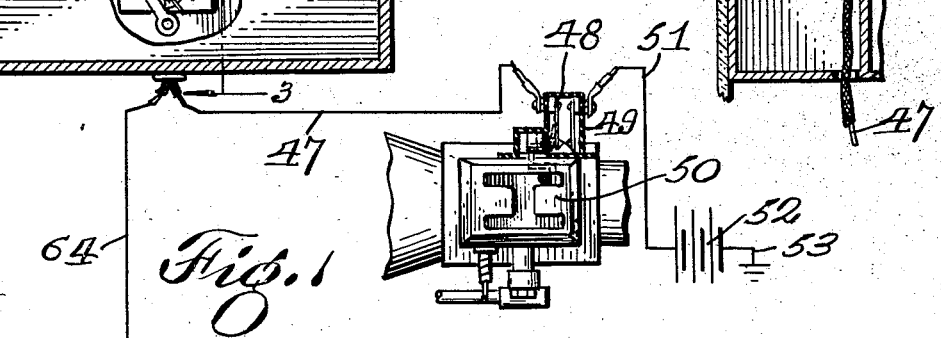
Fig. 1
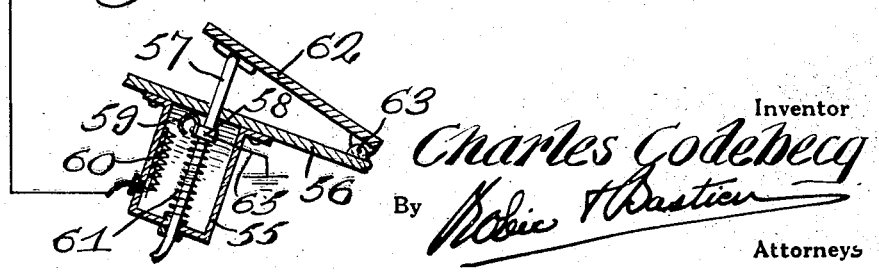
Inventor
Charles Codebecq
By
Attorneys Patented Mar. 17, 1942

2,276,717

UNITED STATES PATENT OFFICE 2,276,717

EFFICIENCY INDICATING MEANS FOR MOTOR VEHICLES

Charles Codebecq, Valleyfield, Quebec, Canada

Application February 2, 1939, Serial No. 254,259

1 Claim. (Cl. 73—51)

The present invention relates to improvements in indicating mechanism and has particular reference to mechanism for indicating the motor efficiency of automobiles and the like.

An object of the invention is the provision of a motor efficiency indicating mechanism of generally improved construction.

Another object of the invention is the provision of mechanism of the above character which will reliably indicate the motor operating efficiency.

A further object of the invention is the provision of indicating mechanism which will indicate the efficiency of throttle operation relative to the velocity of a vehicle.

Still another object of the invention is the provision of mechanism of the aforesaid character which will indicate the vacuum performance of a motor.

A still further object of the invention is the provision of an indicating mechanism of the above character which is relatively simple in construction and reliable in operation.

Other objects and advantages of the invention will become apparent as the description progresses.

In the accompanying drawing forming a part of this specification and in which like reference characters are employed to designate corresponding parts throughout the same:

Figure 1 is a partly diagrammatic and partly detail view of a modified form of the invention, Figure 2 is a side elevational view thereof installed on an automobile, and Figure 3 is an enlarged transverse section taken on the line 3—3 of Figure 1.

Referring to the preferred embodiment of the mechanism, illustrated at Figures 1 to 3 inclusive, 40 designates a semi-circular casing having a dial 41 indicating speed in miles per hour and a pointing hand 42 secured to a rotary operating shaft 43 connected in any well-known manner of speedometer assembly. Within the casing 40 is mounted an electrical instrument 45 which may be in the form of an ammeter operable to swing a relatively small pointer hand 46 in a plane parallel with that of the pointer 42.

The ammeter 45 is connected by an electric conductor 47 with one terminal of switch mechanism 48 mounted in a casing 49 attached to the conventional transmission mechanism 50 of an automobile. The opposite terminal of the switch means 48 connects, through a conductor 51, with a battery 52 which is grounded by a conductor 53. The switch 48, which may be of any preferred construction, is formed and connected so that its contacts retain open positions at all times, except when the transmission mechanism is adjusted to third or high gear position.

A cylindrical shell 55 is secured to and depends from the floor board 56 of the vehicle. A rod 57 extends axially through the shell 55 and through apertures in the bottom thereof and in the floor board and connects with the throttle valve mechanism for operation thereof. Within the shell 55 the rod has secured thereon a collar 58 of conducting material and has secured thereto a curved contact conductor 59. This contact 59 is operable to contact with and slide along an elongated resistance element 60 secured to the wall of the shell inwardly thereof.

A compression coil spring 61 mounted about the rod acts against the collar 58 to yieldingly slide the rod to an elevated position, at which time the contact 59 is arranged above and disconnected from the element 60. An accelerator pedal 62 having one end connected to the floor board 56 by a pivot connection 63 engages the upper end portion of the rod 57 for slidably depressing the rod and opening the throttle valve. A conductor 64 connects the electrical device or ammeter 45 with the bottom end of the resistance element 60 while another conductor 65 connects the collar 58 with a ground connection, as shown to advantage at Figure 1.

When the vehicle is travelling in high gear with normal operating efficiency, the mechanism is adapted to maintain the auxiliary oscillatory pointer 46 approximately behind the speed pointer 42. If, however, the operation is such that the throttle requires greater opening and correspondingly increased fuel supply than should be necessary under the particular operating conditions, the electrically actuated mechanism will cause the pointer 46 to assume an angularly displaced position relative to the dial and to the pointer 42 and thus indicate abnormal inefficient motor performance.

Thus, the form of motor efficiency indicating mechanism hereinbefore described provides mechanism employed in conjunction with speed indicating devices or speedometers for designating in a convenient manner as to whether or not the motor is functioning normally or properly under particular velocity conditions, so that the operator may readily detect abnormal and inefficient action of the motor.

It is to be understood that the form of my invention herein shown and described is to be taken as preferred example of the same, and that various changes as to the shape, size and arrangement of parts may be resorted to without departing from the spirit of the invention or the scope of the subjoined claim.

Having thus described my invention, I claim:

In engine efficiency-indicating mechanism for vehicles having speed indicating means including a pointer movable over a fixed dial, a foot-actuated throttle pedal for engine speed variations, a multi-speed gear transmission and a source of electric power, the combination with the speed indicating means of an electrically actuated auxiliary pointer mounted to move also over the fixed dial in a plane parallel to that of the speed indicating pointer, a resistor fixedly mounted adjacent the throttle pedal, an electric contact associated with said pedal and adapted to move in contact with the resistor for varying the resistance thereof in correspondence with the movement of said pedal, an electric switch associated with the speed transmission adapted to be closed when said transmission is in high gear only, and electric conductors connecting together in series with one side of the electric source the transmission switch, the auxiliary pointer actuating means and one end of the resistor, the pedal contact and the other side of the source being electrically connected together.

CHARLES CODEBECQ.